(12) United States Patent
DiSalvo et al.

(10) Patent No.: US 7,631,487 B2
(45) Date of Patent: Dec. 15, 2009

(54) CONSTANT VOLUME ROCKET MOTOR

(75) Inventors: Roberto DiSalvo, Madison, AL (US);
Mark Ostrander, Madison, AL (US);
Adam Elliott, Hollywood, AL (US)

(73) Assignee: CFD Research Corporation, Huntsville, AL (US)

( * ) Notice: Subject to any disclaimer, the term of this patent is extended or adjusted under 35 U.S.C. 154(b) by 544 days.

(21) Appl. No.: 11/553,899

(22) Filed: Oct. 27, 2006

(65) Prior Publication Data
US 2008/0098711 A1 May 1, 2008

(51) Int. Cl.
*F02K 5/02* (2006.01)
(52) U.S. Cl. .............................. 60/247; 60/204; 60/258
(58) Field of Classification Search .................. 60/247, 60/258, 257, 204, 239, 242; 239/265.11, 239/265.15
See application file for complete search history.

(56) References Cited

U.S. PATENT DOCUMENTS

| | | | | |
|---|---|---|---|---|
| 5,394,690 | A * | 3/1995 | Arszman et al. | 60/233 |
| 6,591,603 | B2 * | 7/2003 | Dressler et al. | 60/258 |
| 6,629,416 | B1 * | 10/2003 | Johnson | 60/770 |
| 7,565,797 | B2 * | 7/2009 | Nyberg et al. | 60/253 |

* cited by examiner

*Primary Examiner*—Michael Cuff
*Assistant Examiner*—Vikansha S Dwivedi
(74) *Attorney, Agent, or Firm*—Tomas Friend, LLC

(57) ABSTRACT

The present invention is a constant volume rocket motor that uses a non-detonating constant-volume, bipropellant combustion process in pulse-mode operation. Opening and closing of the combustion chamber exhaust outlet is controlled by an actuated reciprocating thrust valve (RTV). Fuel enters the combustion chamber at low pressure with the RTV closed. The valve opens after or during combustion when combustion chamber pressure is at or near maximum. The motor has applications in reaction control systems and attitude control systems in spacecraft.

14 Claims, 6 Drawing Sheets

Nozzle

CONSTANT VOLUME ROCKET MOTOR

STATEMENT REGARDING FEDERALLY SPONSORED RESEARCH OR DEVELOPMENT

The U.S. Government may have certain rights in this invention pursuant to SBIR Contract No. F49620-03-C-009 awarded by the Air Force Office of Scientific Research

CROSS-REFERENCE TO RELATED APPLICATIONS

Not Applicable

INCORPORATED-BY-REFERENCE OF MATERIAL SUBMITTED ON A COMPACT DISC

Not Applicable

BACKGROUND OF THE INVENTION

1. Field of the Invention

The present invention is a constant-volume, Reciprocating Thrust Valve (RTV), bipropellant rocket engine. The motor provides improved reliability and fuel efficiency compared to conventional constant pressure rocket motors for precision high-performance pulse-mode propulsion and multi-use in-space thruster applications.

2. Description of Related Art

Conventional liquid bipropellant thrusters are designed based on a constant-pressure combustion cycle. This type of thruster is not well suited for high-precision control of large spacecraft, which requires a pulse-mode operation. Precision control often requires discrete impulse bits having very short on times (<<100 ms), with relatively long off times (>1 sec). During such operation, thrusters rarely, if ever, reach steady-state operating conditions. For bipropellant thrusters, transient phenomena associated with startup and shutdown play a critical role in pulse-to-pulse performance levels and repeatability. As the pulse length becomes shorter and the duty cycle is decreased, the effects of these transients become more pronounced, resulting in drastically reduced specific impulse. Furthermore, the cumulative effects of such transients and low-yield impulse bits can have a serious and adverse impact on spacecraft system performance, reliability, and safety, including the potential for catastrophic failure due to propellant accumulation in the valves and combustion chamber.

The primary cause of pulse-mode performance degradation in constant-pressure thrusters is poor atomization and mixing of propellants resulting in highly inefficient combustion, and in some cases, no combustion at all. For very short pulses, a large percentage of propellant flows out of the combustion chamber without mixing and reacting—an unavoidable feature of constant-pressure combustion that is exacerbated by large dribble volumes, dribble volume mismatch, propellant flash vaporization, and certain combustion chamber geometrical parameters. This low-efficiency combustion process not only reduces performance, but also results in a significant potential for spacecraft contamination. In order to optimize pulse-mode performance of attitude control thrusters, designers typically seek to minimize propellant dribble volume, which requires close coupling of the valves to the injector. During steady state operation, a thermal balance is achieved between the flowing propellants, thermal radiation, and liquid-film cooling (if applicable) and the hot-combustion gases such that the valve temperature does not exceed a maximum specified temperature. During pulse-mode operation at certain duty cycles, however, this thermal balance becomes unstable due to fuel rich combustion and excessive thermal soak-back that can result in overheating of the valves.

An alternative to constant pressure combustion method is constant-volume combustion. Idealized analysis has shown that, for the same propellant supply pressure, higher performance can be obtained in a constant-volume combustion device than the traditional constant pressure rocket. In a constant-volume combustion cycle, propellants are injected into a closed-volume chamber at some low initial pressure and temperature. This closed-volume approach allows for precision-timing control of subsequent mixing, ignition, combustion and flow processes, unlike conventional constant-pressure thrusters where much of the propellant escapes the combustion chamber prior to ignition and complete combustion. When maximum pressure (complete combustion) has been achieved, a Reciprocating Thrust Valve RTV is retracted from the throat and the high-temperature combustion products escape through the nozzle to produce a single impulse bit. After the combustion chamber has been evacuated, the RTV closes and the thruster is ready for the next cycle. For a properly designed constant-volume thruster, near-ideal characteristic velocity (c star) can be achieved for a wide range of impulse bits. Furthermore, passive valving devices (e.g. reed-type valves) may be installed at the injector face to keep propellant dribble volumes full during sustained pulse-mode operation, thereby improving thruster response characteristics. This also enables the decoupling of the propellant flow control valves from the chamber to mitigate problems associated with high heat soak-back during pulse mode operation.

Unlike conventional constant-pressure hypergolic thrusters, where only the flow of propellants can be controlled, an RTV thruster allows control over parameters such as pulse repetition rate, pulse width modulation that can be optimally tuned for enhanced system operation. Given that combustion occurs in a confined volume, this design is ideally suited for scalability. Engines can be made with thrust ranges from millinewton to kilonewton.

The RTV cycle may be configured with multiple chambers firing sequentially through a single nozzle to produce quasi-continuous thrust. Alternatively, multiple thrusters can be configured in groupings or arrays to provide both main propulsion and attitude control in a single propulsion system.

Pulse Detonation motors and processes, such as those disclosed in U.S. Pat. Nos. 5,579,633; 6,062,018; 6,442,930; 6,526,936; 6,886,325; 6,931,833; 7,047,724; 2004/0050038; 2004/0154304; and 2005/0279083 and incorporated by reference, are designed to approximate or mimic constant volume combustion but are distinct from constant-volume combustion in several respects. Pulse detonation occurs in an open chamber while constant volume combustion occurs in a sealed chamber. Pulse detonation relied on extremely rapid fuel consumption (detonation) to complete combustion before unburned fuel leaves the chamber. This embodiment, on the other hand, implements a constant-volume combustion cycle in a deflagrative combustion process without the complexities of detonation. The major difficulty with a pulse detonation engine is initiating the detonation itself. The typical solution is to employ a Deflagration-to-Detonation Transition (DDT). This involves the initiation of a high-energy deflagration that accelerates down the combustion chamber until it becomes fast enough to transition to a detonation. A key difficulty in pulse detonation engines is achieving DDT without requiring an impractically long and drag-imposing combustion chamber on the vehicle. Other difficulties include, noise reduction and damping of the severe vibration caused by the operation of the engine. The present invention is not a pulse detonation motor but a deflagrating constant-volume rocket motor. The RTV mechanism provides many of the same benefits as a pulsed-detonation engine without the need for highly unpredictable detonations and complicated acoustic tuning.

BRIEF SUMMARY OF THE INVENTION

The present invention is a constant volume rocket motor that uses a non-detonating constant-volume combustion process in pulse-mode operation. Opening and closing of the combustion chamber exhaust outlet is controlled by an actuated reciprocating thrust valve (RTV). Fuel enters the combustion chamber at low pressure with the RTV closed. The valve opens after or during combustion when combustion chamber pressure is at or near maximum.

DETAILED DESCRIPTION OF THE INVENTION

The present invention is a constant-volume rocket thruster featuring a Reciprocating Thrust Valve (RTV) mechanism with a canted-coil reciprocating seal that enables a pulse-rocket operating cycle without detonations. This configuration provides advantages over conventional constant-pressure thrusters. For example, pressure in the constant-volume combustion chamber is low during propellant injection, whereas propellant injected into a constant-pressure combustion chamber must overcome the high pressure in the combustion chamber. Consequently, constant-pressure engines require extremely high pressure tanks or turbines to force propellant into the combustion chamber. The constant volume motor requires minimal force to control propellant injection. The elimination of turbines and high pressure tanks reduces the overall weight of the vehicle. The RTV configuration provides higher-efficiency, short duration pulses than constant-pressure and pulse detonation combustion with virtually no loss of un-burnt propellants and minimal production of contaminants and offers complete timing control of the injection, mixing, ignition, combustion, and exhaust processes. A single thruster can provide either main propulsion through sustained, high-repetition, pulse-mode operation or reaction control through single discrete pulses making it a true multi-use in-space engine. Multiple thrusters can be combined to provide simultaneous main propulsion and attitude control by individually controlling the pulse modulation of each thruster in sustained operation.

Figure 1:
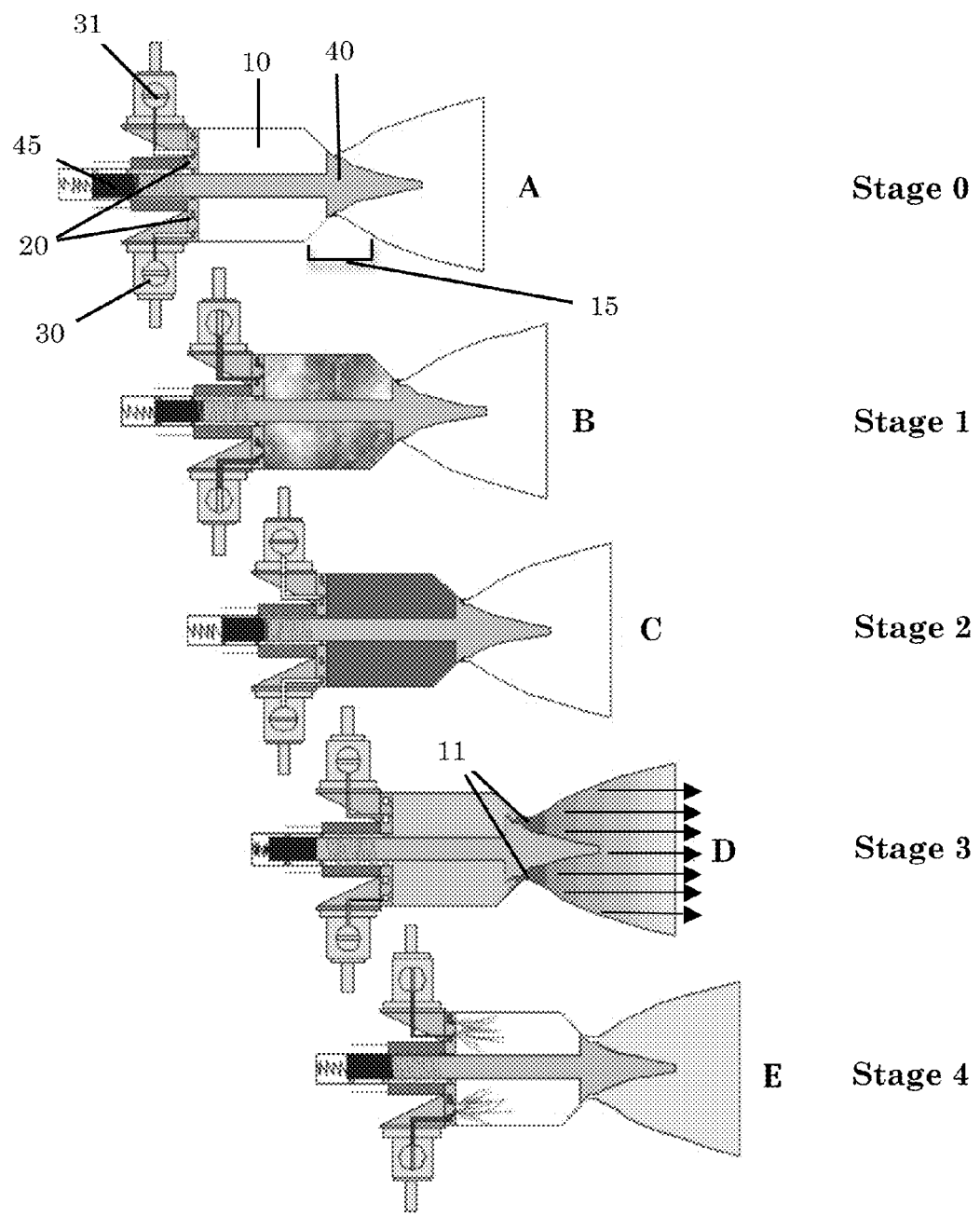
FIG. 1 illustrates the RTV Thruster Operational Firing Sequence.

FIG. 1 A-E illustrates the basic configuration and operational sequence of the RTV thruster. The thruster comprises a combustion chamber 10, a nozzle 15, an injector 20 optimized for rapid mixing, two reed-protected propellant Flow Control Valves (FCVs) 30 and 31 configured to control fuel and oxidant flow, and a Reciprocating Thrust Valve mechanism comprising a Reciprocating Thrust Valve 40 and an actuator 45. The RTV configuration shown in FIG. 1 is one exemplary embodiment of a thruster configuration. Stage 0, FIG. 1A, represents the thruster just prior to a "cold start," when the RTV 40 and FCVs 30, 31 are closed, the combustion chamber 10 is evacuated, and the temperature is either ambient or system controlled. Upon system command, Stage 1 (FIG. 1B), the FCVs 30, 31 open, while the RTV 40 remains shut, allowing the fuel and oxidant to thoroughly mix at relatively low pressures prior to ignition (assuming non-hypergolic propellant combinations). Based on a predetermined delay, and/or sensor feedback, a second command is issued for closure of the FCVs 30 and ignition of the fuel and oxidant mixture resulting in combustion and a rapid pressure rise (Stage 2, FIG. 1C). When a certain time and/or pressure threshold is reached, a third command is issued to open the RTV 40, allowing the hot combustion gases to escape via outlet 11 in blowdown mode to produce a single impulse bit (Stage 3, FIG. 1D). Finally, at Stage 4 (FIG. 1E), when the chamber 10 is nearly evacuated, the RTV 40 begins to close as FCVs 30 open and a fresh propellant mixture is drawn into the chamber 10, starting the cycle again at Stage 1 in sustained pulse-mode operation. Alternatively, the pulse train is terminated and the cycle returns to Stage 0 without the FCVs opening at Stage 4.

Figure 2:
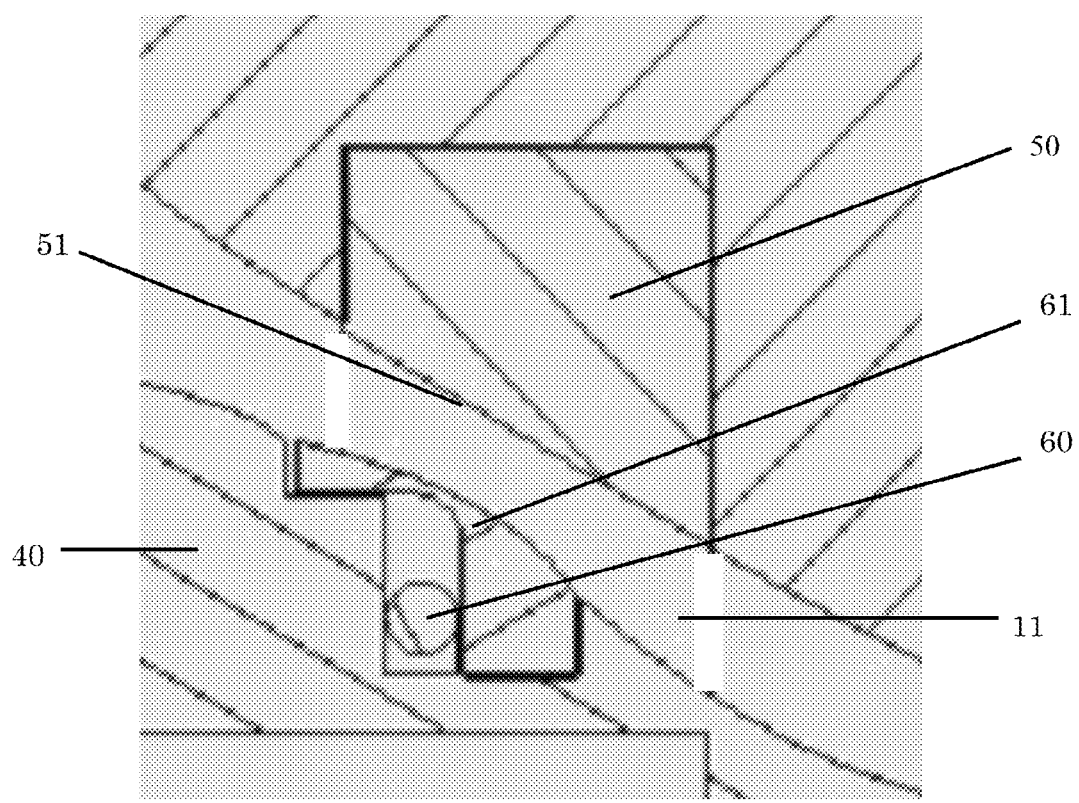
FIG. 2 is a drawing of a Canted-Coil Reciprocating Seal.

Sealing of the combustion chamber is important for optimal operation of the constant volume rocket motor. One preferred embodiment of the invention uses a canted-coil reciprocating seal design that provides necessary sealing capability and absorbs impact forces generated by the striking of the RTV pintle onto the throat of the combustion chamber outlet. One canted-coil reciprocating seal design is shown in FIG. 2. The figure shows a cross section of a portion of the RTV 40 that comes into contact with a nozzle seat 50 on the wall of the combustion chamber to form the canted-coil seal 61. This design comprises a canted-coil spring 60 that holds the spring force nearly constant over a wide deflection range. As wear occurs to the seal jacket 51, the spring continues to provide the same sealing force.

The RTV thruster can be controlled by a system (FIG. 3) comprising controller software and hardware including: oxidant and fuel flow valves; a pneumatic RTV actuator; a chamber pressure transducer; and igniter. A timing diagram for a constant-volume rocket motor is shown in FIG. 4. At the beginning of each cycle, the fuel and oxidizer valves open to fill the chamber with reactants. Injection of the reactants occurs at the fill pressure, $P_f$. A brief delay is imposed to allow for proper reactant mixing. At t=0, a spark igniter is activated and initiates the combustion process. The chamber pressure begins to rise as the combustion process progresses. As the pressure rises through the RTV-Open (RTVO) threshold, the RTV is commanded to move to the fully open position. The RTVO threshold level is nominally set to the expected initial combustion pressure, $P_0$.

Due to the finite slew rate of the RTV actuator, the throat area will increase over a finite period of time. As the throat area increases, the thrust level increases and the pressure decreases. At a certain point in time, the effect of decreasing pressure will be more than offset by the increasing throat area, and as a result the thrust level will decrease. As the decreasing pressure drops through the RTV-Close (RTVC) threshold, the RTV will be commanded to begin closing as rapidly as possible. The throat area will be fully closed as the chamber pressure reaches the fill pressure. At the moment the pressure reaches the fill pressure, opening of the fuel and oxidizer valves restarts the cycle. The cycle time is may be as fast as 100-250 ms.

A control system algorithm may be used to maximize the time-integrated impulse of the engine through manipulations of the fill time, mixing time delay and RTVO and RTVC threshold levels. Existing software, such as PINCON® developed by CFDRC may be use, for example. This software package allows, for example, the active control of pulse duration, which is of importance in time-critical maneuvers.

Figure 5:
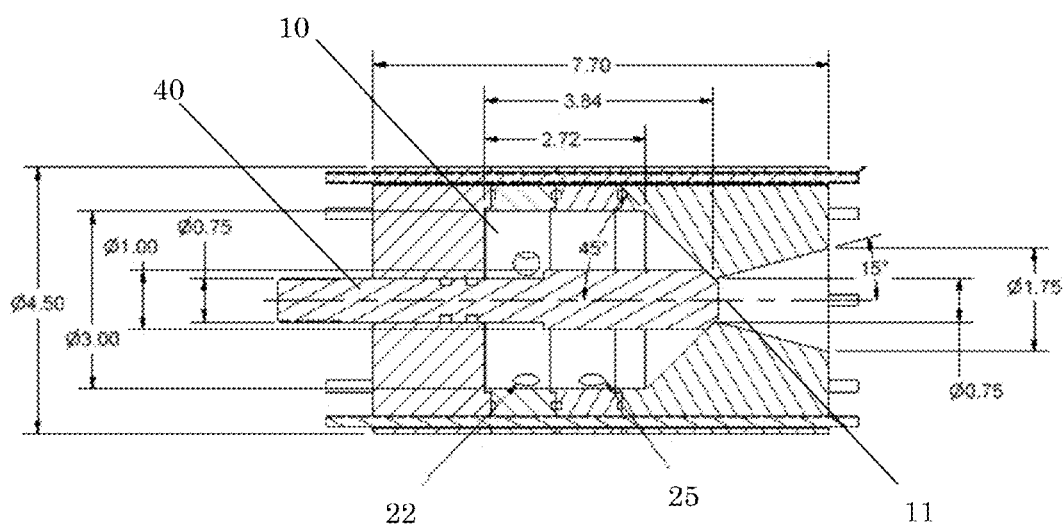
FIG. 5 shows a drawing of a pintle-type RTV motor design.

A non-detonative pulsed bi-propellant rocket was built to demonstrate an RTV—nozzle combination. A heavy-wall demonstration motor was tested using a gaseous propellant combination of propane and nitrous oxide. The motor generated brief chamber pressure pulses on the order of 500-700 psia using injector inlet pressures of only 40-50 psia. This ratio will scale linearly to any desired value. The motor, therefore, offers the efficiency of high pressure operation but does not require the heavy case weights and pressurant systems required in a steady-state rocket operating at the same high pressures. The test motor used a non-optimal pintle-nozzle configuration rather than the canted-coil reciprocating seal. FIG. 5 shows a drawing of the pintle-nozzle motor design including the combustion chamber 10, outlet 11, injector port 22, igniter 25, and pintle-type RTV 40. An igniter is not necessary when using hyprgolic fuels.

Figure 6:
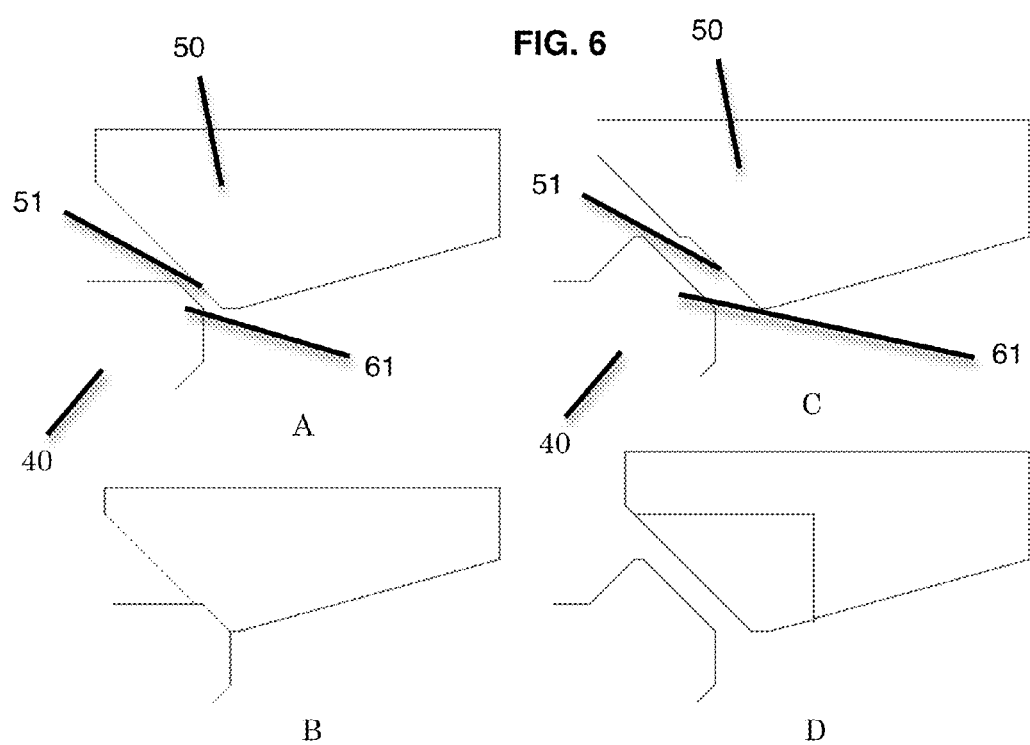
FIG. 6 illustrates techniques for controlling wear in an RTV seal.

Modifications to the surfaces of the RTV and combustion chamber wall such as surface area of contact, shapes of contacting surfaces, and material compositions of surfaces may be useful to counter or control wear and to increase or decrease the force needed to open or close the RTV (FIGS. 6 A-D). FIG. 6A shows an initial seal design in cross-section and FIG. 6B shows a modification with an indentation in the nozzle material to receive the RTV to improve sealing. FIG. 6C shows a seal in which the RTV is shaped in such a way that pressure within the combustion chamber presses the valve against the nozzle. FIG. 6D illustrates one way in which the material composition of the nozzle or RTV may be altered to reduce damage to the sealing surfaces. The figures show a pintle-type RTV without a canted-coil reciprocating seal but the modifications can be made to either type of RTV seal.

Figure 3:
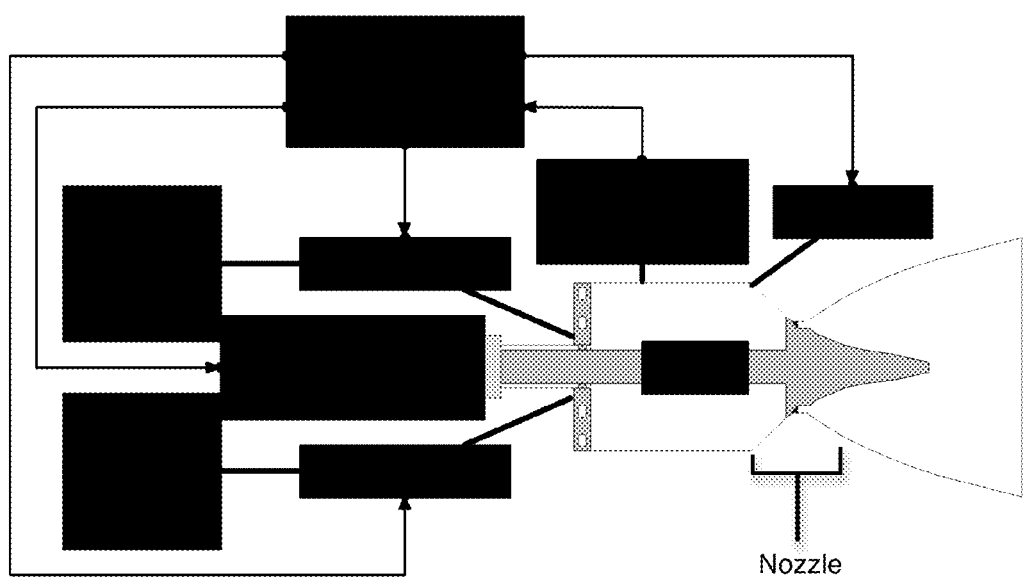
FIG. 3 is a schematic of an Operational Control System.
Figure 4:
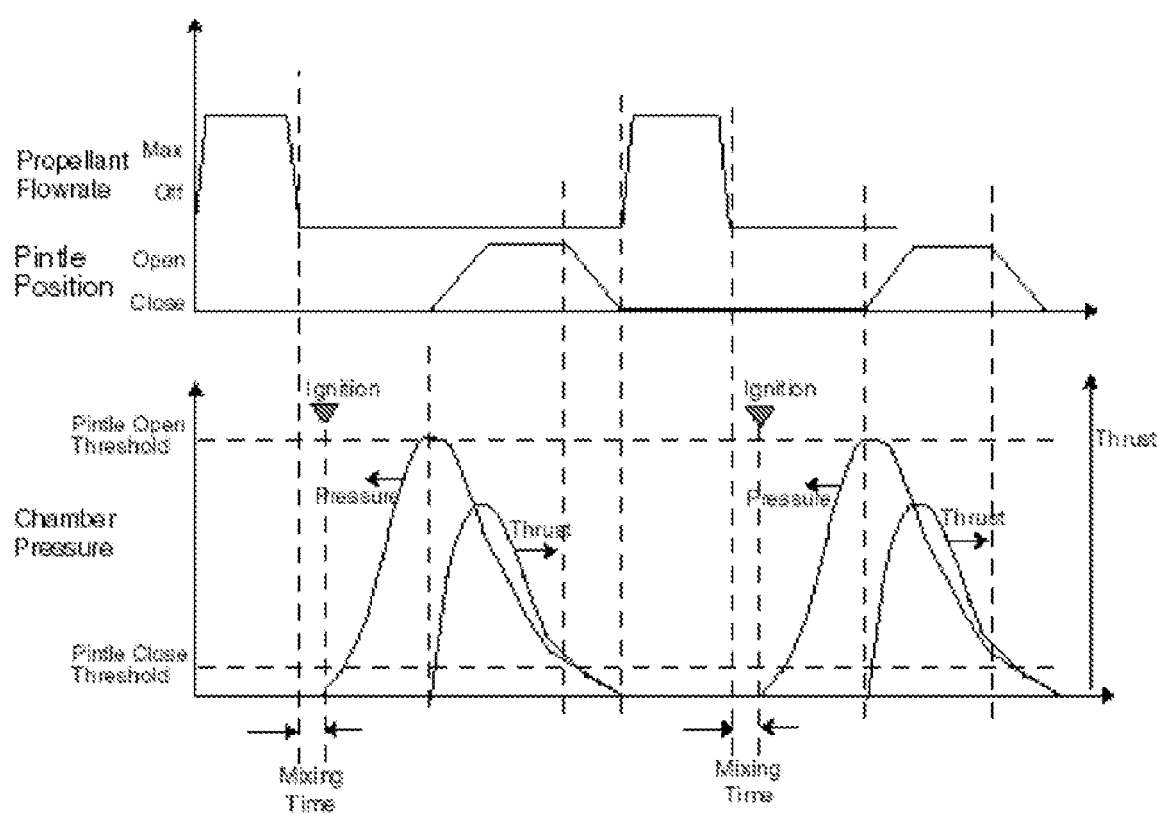
FIG. 4 shows an RTV Thruster Control Timing Diagram.

FIG. 1 and FIG. 3 show constant-volume rocket motors in which the RTV comprises an extension that extends into the rocket nozzle. Such an extension is not necessary and is not shown, for example, in FIG. 5. An RTV extension can be used to control the flow of thrust in the nozzle. The size and shape of such an extension are determined by rocket motor design parameters known in the art.

Although particular embodiments of the present invention have been described, it is not intended that such references be construed as limitations upon the scope of this invention except as set forth in the following claims.

What is claimed is:

1. A method of operating a constant volume rocket motor comprising:
    a) injecting fuel into a combustion chamber having an outlet that is sealed from the inside of the combustion chamber by means of a reciprocating thrust valve contacting an interior surface of the combustion chamber;
    b) allowing or initiating combustion of the fuel in the sealed combustion chamber;
    c) moving the reciprocating thrust valve away from contact with the interior surface of the combustion chamber to allow combustion products to escape through the outlet;
    d) moving the reciprocating thrust valve into position to contact an interior surface of the combustion chamber and thereby sealing the combustion chamber; and
    e) optionally, repeating steps a) though d).

2. The method of claim 1 in which the sequence of steps a) though d) is repeated and the time between repetitions of the sequence is 100 milliseconds or greater.

3. The method of claim 1 further comprising the step of:
    measuring a pressure inside the combustion chamber and using the measured pressure to control a timing of reciprocating thrust valve opening and closing.

4. A constant-volume rocket motor comprising:
    a combustion chamber having a nozzle, said nozzle narrowing to form an outlet;
    an injector configured for injecting fuel into the combustion chamber; and
    a reciprocating thrust valve mechanism comprising a reciprocating thrust valve and an actuator; wherein
    a surface of the reciprocating thrust valve is configured to seal the combustion chamber by contacting the nozzle on an interior surface of the combustion chamber such that combustion products are prevented from leaving the combustion chamber through the outlet and
    the reciprocating thrust valve is configured to open by moving the valve in a direction away from the outlet and into the combustion chamber.

5. The constant-volume rocket motor of claim 4, wherein the actuator of the reciprocating thrust valve mechanism is located in opposition to the outlet of the combustion chamber and the reciprocating thrust valve traverses the interior of the combustion chamber from the actuator to the outlet.

6. The constant-volume rocket motor of claim 4, and further comprising a computer control system in communication with a pressure transducer measuring pressure within the combustion chamber, said computer control system comprising controller software and controller hardware configured to control fuel and oxidant valves, the reciprocating thrust valve actuator, and an igniter.

7. The constant-volume rocket motor of claim 4, wherein the actuator is a pneumatic actuator.

8. The constant-volume rocket motor of claim 4 wherein a portion of the reciprocating thrust valve extends from the combustion chamber through the outlet of the nozzle.

9. The constant-volume rocket motor of claim 4 comprising two fuel injectors, one each for different fuels.

10. The constant-volume rocket motor of claim 4 further comprising at least one ignition source.

11. The constant-volume rocket motor of claim 4 further comprising a pressure transducer in communication with a controller that controls the actuator for the reciprocating thrust valve in response to changes in pressure inside the combustion chamber.

12. The constant-volume rocket motor of claim 4 wherein the reciprocating thrust valve comprises a canted-coil reciprocating seal that contacts a nozzle seat on a wall of the nozzle to seal the combustion chamber.

13. The constant-volume rocket motor of claim 4 wherein the actuator applies a first force to the reciprocating thrust valve to open the valve and a second, opposing force to close the valve and wherein the first force is greater than the second, opposing force.

14. The constant-volume rocket motor of claim 4 wherein the actuator applies a first force to the reciprocating thrust valve to open the valve and a second, opposing force to close the valve and wherein the second, opposing force is greater than the first force.

* * * * *